United States Patent
Flood et al.

(10) Patent No.: US 10,708,157 B2
(45) Date of Patent: Jul. 7, 2020

(54) LINK QUALITY DIAGNOSTIC APPLICATION

(71) Applicant: Starkey Laboratories, Inc., Eden Prairie, MN (US)

(72) Inventors: Stephen Paul Flood, Eden Prairie, MN (US); Beau Jay Polinske, Minneapolis, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 153 days.

(21) Appl. No.: 14/970,336

(22) Filed: Dec. 15, 2015

(65) Prior Publication Data

US 2017/0171046 A1    Jun. 15, 2017

(51) Int. Cl.
| | |
|---|---|
| H04L 12/26 | (2006.01) |
| H04W 4/80 | (2018.01) |
| H04B 17/309 | (2015.01) |
| H04R 25/00 | (2006.01) |
| H04B 1/3827 | (2015.01) |

(52) U.S. Cl.
CPC ............ H04L 43/08 (2013.01); H04B 1/385 (2013.01); H04B 17/309 (2015.01); H04R 25/00 (2013.01); H04R 25/554 (2013.01); H04W 4/80 (2018.02); *H04R 2225/55* (2013.01); *H04R 2420/07* (2013.01)

(58) Field of Classification Search
CPC ... H04L 29/08072; H04L 29/06; H04L 43/00; H04L 12/2602; H04L 41/22; H04R 25/70; H04R 25/30; H04R 25/505; H04R 25/305; A61B 5/121

USPC .......................................................... 709/224
See application file for complete search history.

(56) References Cited

U.S. PATENT DOCUMENTS

| | | | |
|---|---|---|---|
| 6,847,916 B1 * | 1/2005 | Ying .................. | G05B 23/0208 702/108 |
| 8,442,248 B2 | 5/2013 | Solum et al. | |
| 8,687,817 B2 | 4/2014 | Westergaard | |
| 8,744,092 B2 | 6/2014 | Cherigui | |

(Continued)

FOREIGN PATENT DOCUMENTS

| | | |
|---|---|---|
| EP | 1980132 B1 | 10/2008 |
| EP | 2779699 A2 | 9/2014 |

OTHER PUBLICATIONS

"European Application Serial No. 16204355.8, Extended European Search Report dated Apr. 21, 2017", 8 pgs.

(Continued)

*Primary Examiner* — Mahran Y Abu Roumi
(74) *Attorney, Agent, or Firm* — Schwegman Lundberg & Woessner, P.A.

(57) ABSTRACT

A system for use by an end user of a wearable device may include a personal electronic device configured to communicate over a wireless communication link to the wearable device. The personal electronic device may include a link quality diagnostic application. The personal electronic device is configured to operate on the link quality diagnostic application to present the end user of the wearable device with one or more troubleshooting questions based on a link quality degradation, and process one or more answers from the end user, and provide diagnostic feedback to the end user to suggest corrective action to improve the link quality of the wireless communication link.

20 Claims, 8 Drawing Sheets

(56) References Cited

U.S. PATENT DOCUMENTS

| | | | | |
|---|---|---|---|---|
| 9,369,760 B2* | 6/2016 | Jacobsen | | H04N 21/43637 |
| 2003/0003868 A1* | 1/2003 | Juurikko | | H04B 17/23 |
| | | | | 455/41.1 |
| 2003/0137414 A1* | 7/2003 | Chen | | H04W 68/00 |
| | | | | 340/539.1 |
| 2004/0234090 A1* | 11/2004 | Berg | | H04R 25/70 |
| | | | | 381/314 |
| 2006/0029245 A1* | 2/2006 | Westergaard | | H04R 25/70 |
| | | | | 381/312 |
| 2007/0226319 A1* | 9/2007 | Laszakovits | | H04L 67/28 |
| | | | | 709/218 |
| 2008/0240453 A1* | 10/2008 | Westergaard | | H04R 25/70 |
| | | | | 381/60 |
| 2009/0248420 A1* | 10/2009 | Basir | | H04M 1/6075 |
| | | | | 704/275 |
| 2010/0054512 A1* | 3/2010 | Solum | | H04R 25/554 |
| | | | | 381/315 |
| 2010/0235747 A1 | 9/2010 | Young | | |
| 2013/0117696 A1* | 5/2013 | Robertson | | G06F 19/3418 |
| | | | | 715/763 |
| 2013/0125004 A1* | 5/2013 | Zheng | | G06F 3/048 |
| | | | | 715/736 |
| 2013/0142345 A1* | 6/2013 | Waldmann | | H04R 25/70 |
| | | | | 381/56 |
| 2013/0174205 A1* | 7/2013 | Jacobsen | | H04N 21/43637 |
| | | | | 725/81 |
| 2013/0251180 A1* | 9/2013 | Solum | | H04R 25/554 |
| | | | | 381/315 |
| 2014/0270211 A1* | 9/2014 | Solum | | H04R 25/554 |
| | | | | 381/60 |
| 2014/0270213 A1* | 9/2014 | Greenbush | | H04R 25/30 |
| | | | | 381/60 |
| 2015/0163041 A1* | 6/2015 | Kodali | | H04L 1/1812 |
| | | | | 370/252 |
| 2016/0183010 A1* | 6/2016 | Natarajan | | H04R 25/453 |
| | | | | 381/318 |

OTHER PUBLICATIONS

"European Application Serial No. 16204355.8, Communication Pursuant to Article 94(3) EPC dated Mar. 16, 2018", 6 pgs.

"European Application Serial No. 16204355.8, Communication Pursuant to Article 94(3) EPC dated Nov. 23, 2018", 5 pgs.

* cited by examiner

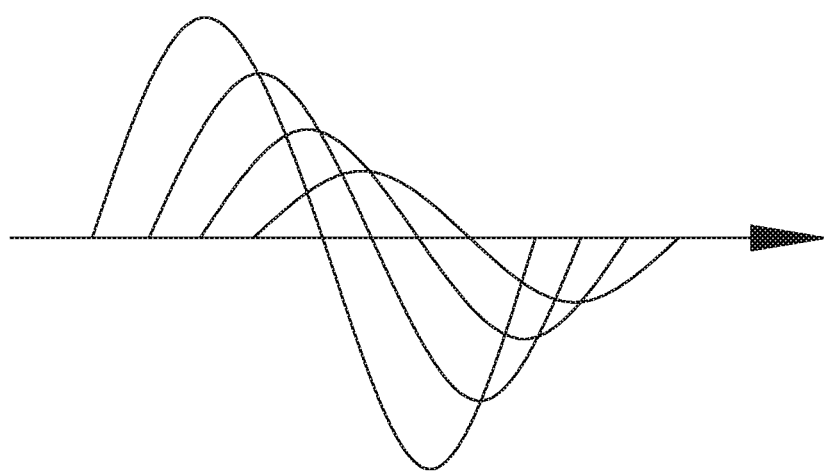
FIG. 4
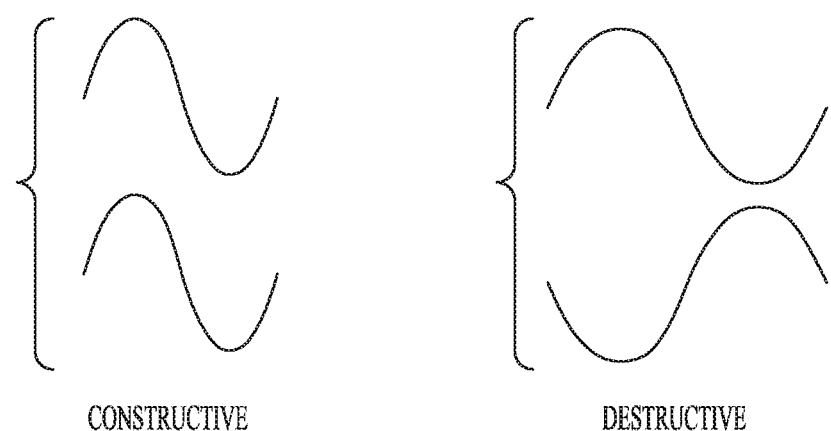
CONSTRUCTIVE
FIG. 5A
DESTRUCTIVE
FIG. 5B

LINK QUALITY DIAGNOSTIC APPLICATION

TECHNICAL FIELD

This document relates generally to wireless communication systems and more particularly to methods and apparatus for improving link quality.

BACKGROUND

Radio waves are electromagnetic waves that can be used in wireless communication. The frequencies of these waves serve as physical communication channels. The radio frequency (RF) spectrum has a finite range of frequencies, and thus a limited number of channels. In the United States, for example, the Federal Communications Commission (FCC) decides how the spectrum is allocated and what bands are used for what purpose. Communication signals on the same channel interfere, assuming the strengths of the signals are non-negligible due to transmission power and distance. Also, communication signals on adjacent channels may interfere with communications on the desired channel because of inadequate filtering, tuning or frequency control. Adjacent channel interference can increase with an increase in signal power in adjacent channels.

Most countries of the world have allocated certain frequency spectrums for commercial use as "unlicensed" wireless bands. For example, the FCC has designated license-free bandwidth segments for industrial, scientific and medical (ISM) uses. Various commercial applications use this unlicensed bandwidth for short range wireless communication. Channels are not allocated within the license-free band. Commercial devices designed to operate in the license-free band are constrained to transmit using a relatively low power, which allows more commercial devices to use the unlicensed frequency bands by increasing the reuse of a frequency.

Furthermore, not only may a number of commercial devices be operating within a communication band, but also more than one wireless technology may co-exist within the communication band. For example, the 2.4 GHz band includes wireless LAN, Bluetooth and IEEE 802.15.4 technologies. Wireless LAN, falling under the 802.11b and 802.11g standards, has three non-overlapping channels with a bandwidth of 22 MHz. Subsequent revisions on the 802.11 standard has increased the wireless LAN bandwidth above 22 MHz. Bluetooth technology has 79 channels each with a bandwidth of 1 MHz, Bluetooth low energy technology has 40 channels each with a bandwidth of 2 MHz, and IEEE 802.15.4 has 11 channels with a bandwidth of 5 MHz. Wireless communication devices attempt to select adequate channels through which to communicate within this environment. For example, AFH (adaptive frequency hopping) may be used to select adequate channels based on both RSSI (Received Signal Strength Indication) noise measurements and based on retransmission attempts.

Signal attenuation and interference sources can impact wireless link quality. Wireless link quality may be further degraded if the wireless signal source, such as a phone, is in a person's pocket and/or is operating in a non-multi-path environment. The degraded wireless link quality may cause the person to experience overall degraded performance.

Wireless propagation is statistical in nature. The wireless link quality may vary drastically from individual to individual and from environment to environment. Some people may not experience significant degradation in link quality whereas others may experience significant link quality degradations. Furthermore, environmental variables may impact the degradation in performance experienced by the person, but the source of the degradation may not be intuitively known to the user. In an effort to statistically improve link performance, some manufacturers specify that the wireless signal source (e.g. phone) should be placed in specific locations. However, this does not educate the end customer to optimize the link quality.

Data may be collected on a phone and then later transferred the data to a location in the cloud for retrieval and analysis by a computer utility. However, this process is not efficient for the end customer. RSSI has been used for different applications to provide a measure of the power present in a received signal. However, the end user does not access the RSSI if the phone is in the pocket.

Accordingly, there is a need in the art for improving wireless communication to assist the end user in diagnosing and solving link quality problems.

SUMMARY

Disclosed herein, among other things, are wireless communication systems and methods. Various embodiments monitor one or more link quality metrics (LQMs), and present an end user with troubleshooting question(s) based on a link quality degradation.

An example of system for use by an end user of a wearable device, includes a personal electronic device configured to communicate over a wireless communication link to the wearable device. The personal electronic device may include a link quality diagnostic application. The personal electronic device is configured to operate on the link quality diagnostic application to present the end user of the wearable device with one or more troubleshooting questions based on a link quality degradation, and process one or more answers from the end user, and provide diagnostic feedback to the end user to suggest corrective action to improve the link quality of the wireless communication link.

An example of a method includes using a link quality diagnostic application operated on by a personal electronic device to present an end user of a wearable device with one or more troubleshooting questions based on a link quality degradation for a wireless communication link between the wearable device and the personal electronic device, process one or more answers from the end user, and provide diagnostic feedback to the end user to suggest corrective action to improve the link quality of the wireless communication link.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

FIG. 4 is a simple illustration, provided by way of example and not limitation, of the multipath waveforms in the time domain that may be received at a wireless receiver.

FIGS. 5A and 5B illustrate constructive wave interference and destructive wave interference for two waves.

DETAILED DESCRIPTION

Figure 1A:
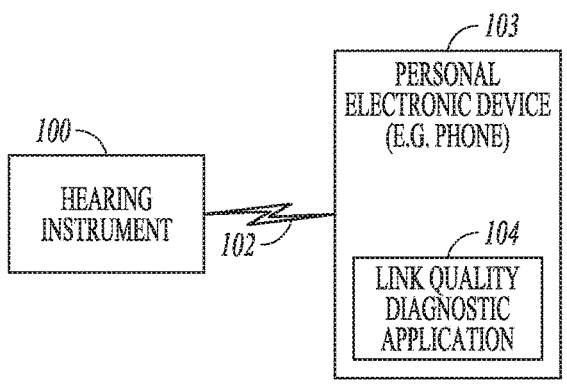
FIGS. 1A-1H illustrate, by way of example and not limitation, some wireless communication networks.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing instruments using the example of hearing aids. Hearing aids are only one type of hearing instrument device capable of wirelessly communicating with another device. Furthermore, hearing aids are only one type of a wearable device configured to be worn by the end user and that is capable of wirelessly communicating with another device. Such wireless devices worn by a person may be referred to as a wearable device, wearable technology, fashion electronics, or wearable computer, for example. Examples of such devices may include watches and glasses. It is understood that the use of hearing aid(s) the description is intended to demonstrate the present subject matter, but not in a limited or exclusive or exhaustive sense. The present subject matter may be implemented in systems that include other devices such as, but not limited to, Bluetooth-enabled headsets, laptop computers, tablets, MP3 players, and televisions.

Battery-powered remote devices that function as hearing assistance devices (e.g. hearing instrument) transmit with limited power, such that, as seen by the receiver of the transmission (e.g. communicator or other hearing instrument), the transmission is near the noise floor of the occupied channel. Communication with low power devices, having little power available for transmission, will have minimal link margin. A high data throughput can be achieved using a low power RF link when the link is of good quality. However, multi-path fading, interference, body and head shadowing, and increased range potentially impair the link.

A personal electronic device such a smart phone, tablet, wearable device, or other device has the capability be used to host a link quality diagnostic application when the hearing instrument or wireless headset device is used. The personal electronic device may be a hand-held device capable of being carried by a person or on a person. For example, the personal electronic device may be capable of being carried in a pocket of the person's clothing. The link quality diagnostic application may be configured to monitor the quality of wireless communication link(s) to other device(s).

Embodiments of the present subject matter may adaptively monitor the link to detect degraded link quality and provide feedback to the end user on potential causes of the degraded link quality. For example, various embodiments monitor one or more link quality metrics (LQMs), and provide a notification to the user if the LQM(s) falls below a predetermined threshold. Examples of LQMs include, but are not limited to, received signal strength indicator (RSSI), bit error rate (BER), packet error rate (PER), cyclic redundancy check (CRC) errors, forward error correction (FEC) errors, signal-to-noise ratio (SNR), and the frequency and/or number of retransmissions. LQMs may also include an echo test or other test that provides a metric of the wireless communication link. An Echo test may be implemented to provide some indication of the performance of the wireless link without stressing the link. Any one or any combination of assessments may be performed simultaneously or in various sequences to provide diagnose a likely cause of a degraded link quality. Multiple LQMs may be inputted into an LQM function to provide an LQM output used to detect and/or diagnose link quality issues. A device on a first end of a link and a device on another end of the link may contribute to the LQM function. Bluetooth uses a Host Controller Interface (HCI). Application Program Interface (API) commands are sent over HCI. These commands maybe monitored to diagnose problems with the link. Non-Bluetooth wireless links may be similarly monitored.

Figure 1B:
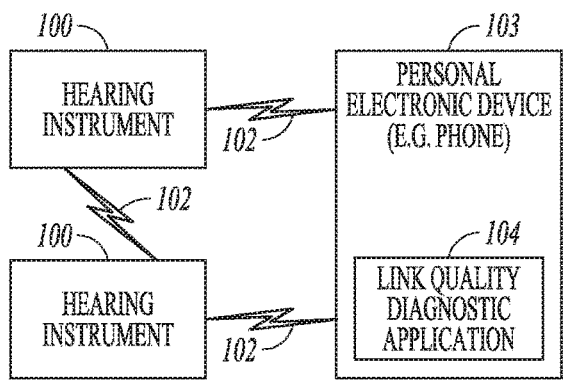

FIGS. 1A-1H illustrate, by way of example and not limitation, some wireless communication networks. The networks may include two or more devices. The network may be configured such that any device in the wireless network may communicate with any one or more of the devices on the network. In some embodiments, the devices may be configured to function as host(s) and to function as peripheral(s). The systems illustrated in FIGS. 1A-1H include one or more hearing instruments 100 and a personal electronic device 103. FIG. 1A illustrates an example of a system with one hearing instrument, and FIG. 1B illustrates an example of a system with two hearing instruments such as may be used to assist hearing in both ears of the end user.

FIGS. 1B-1G illustrate, by way of example, a communications link between one hearing instrument and the second hearing instrument. The personal electronic device 103 is configured to communicate over a wireless link 102 to one hearing instrument or all hearing instruments 100. Furthermore, two or more hearing instruments may be configured to wirelessly communicate with each other over a wireless link. The personal electronic device 103 may include a smart phone, tablet, MP3 player, a television, a computer, a car stereo system, or other personal electronic device(s), by way of example and not limitation. In the illustrated embodiment, the personal electronic device 103 is programmed with a link quality diagnostic application 104. The personal electronic device includes the hardware, software and firmware to operate on the link quality diagnostic application to assist the end user in diagnosing and solving link quality issues. By way of example and not limitation, the personal electronic device 103 may be connected to a wireless network, and may be connected to hearing instrument(s) or other device(s) using Bluetooth technology.

Figure 1C:
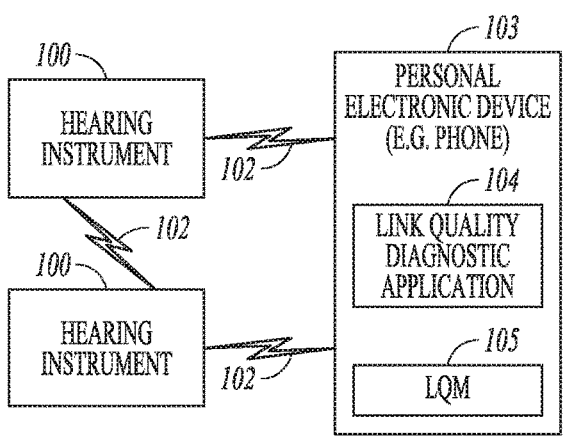
Figure 1D:
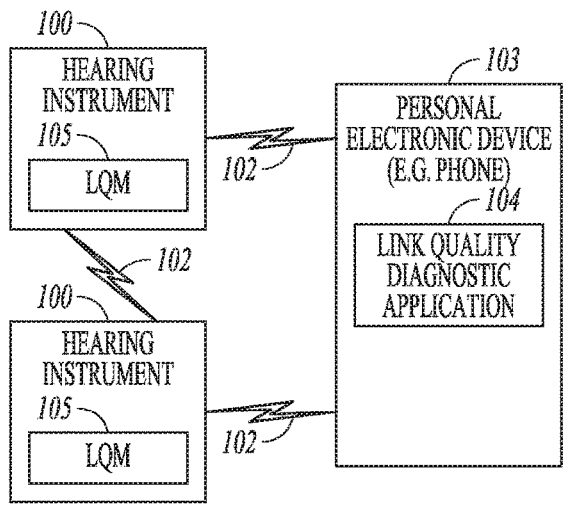
Figure 1E:
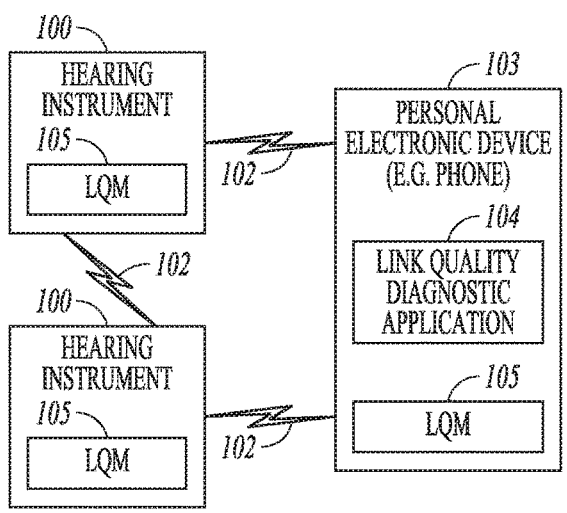
Figure 1F:
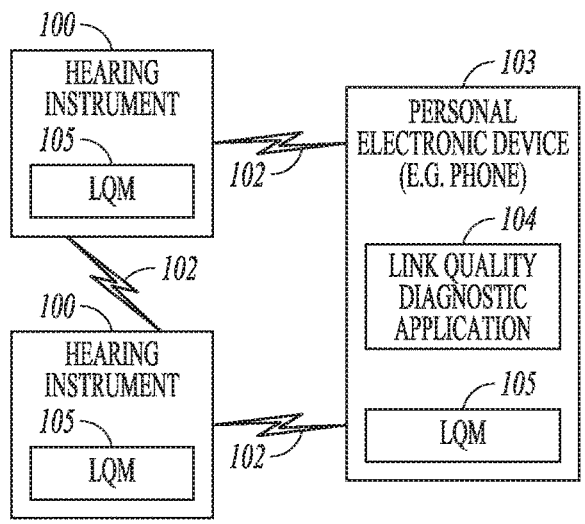
Figure 1G:
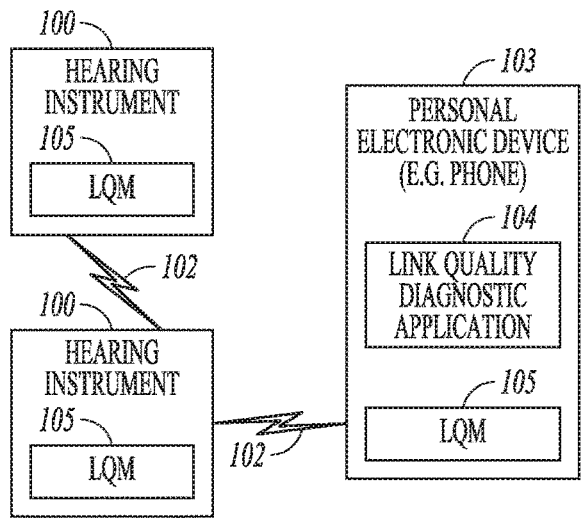
Figure 1H:
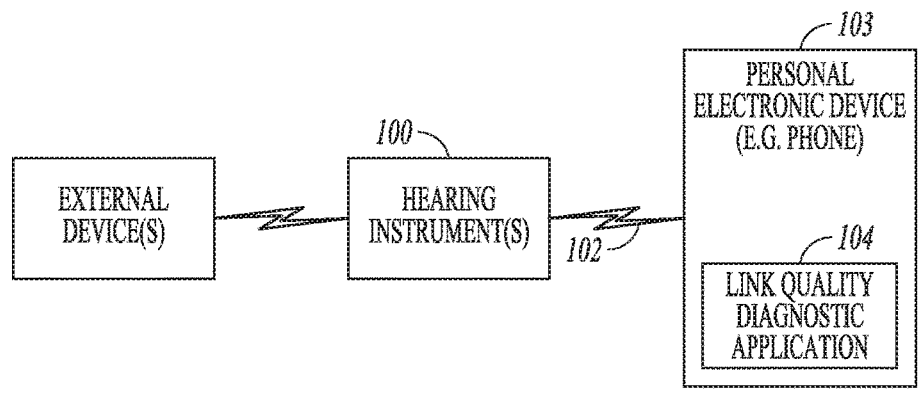

As generally illustrated in FIG. 1H, the hearing instrument(s) 100 may be connected to one or more external devices such as a television and cellular phone. One of the hearing instruments may be connected to one or more external devices or more than one may be connected to one or more external devices. A broadcast signal or ad hoc microphone delay may also represent an external device. The additional device may or may not have an LQM monitor. The link quality diagnostic application may be used to diagnose the wireless link(s) between the hearing instrument(s) and the external device(s).

The wireless communication between two wireless devices may be referred to as a wireless communication link. The communication link is used to communicate information. Examples of information include, but are not limited to, digital data, parameters, audio information, control data, commands, and programming instructions. In radio frequency (RF) communication, the communication link uses a transmission frequency to establish the link in a communication channel. The radio frequency (RF) communication may be at, but is not limited to, 2.4 GHz using Bluetooth or at 900 MHz. The communication link may be implemented using Near Field Magnetic Induction (NFMI) frequencies.

The system is configured with the capability to monitor at least one LQM. This capability may be performed by a LQM monitor 105, which may be configured to measure one or more types of LQMs. LQMs may be measured using the personal electronic device 103 such as is illustrated in FIG. 1C, or may be measured using the hearing instrument(s) 100 such as illustrated in FIG. 1D. In some embodiments, the LQM measurements may be distributed between or among two or more devices such as is generally illustrated in FIG. 1E. Regardless of where the LQMs are measured, the application on the personal electronic device may be used to process the LQMs. The LQMs may be for link(s) between hearing instruments, and/or may be for link(s) between personal electronic device(s) and hearing instrument(s). One type of processing compares the LQM(s) with predetermined threshold(s).

In various embodiments, the personal electronic device 103 may be configured to operate on the link quality diagnostic application 104 to alert the end user of the degraded link quality using the hearing instrument to present sound to the end user, or alert the end user of an improved link quality using the heating instrument to present sound to the end user, or alter the end user of both the degraded link quality and the improved link quality using the hearing instrument to present sound to the end user. For example, if a LQM degrades below a predefined threshold, the link quality diagnostic application 104 may log the degraded link and provide a status alert to the end user. The personal electronic device 103 may provide diagnostic information on how the end user could improve the performance of the wireless link 102. For example, the application 104 running on the personal electronic device 103 may suggest to the end user that the end user orient the phone differently in the pocket or move the personal electronic device (e.g. phone) to a different pocket because the body may be shadowing the signal. This diagnostic information may be provided as part of the status alert to the user or may otherwise be provided using device operating the link quality diagnostic application. The alert may include an audible indication through the receiver of the hearing instruments to indicate a possible link issue that may be resolvable by the user through the repositioning of the connected device (e.g. phone) and/or indicate when the issue has been resolved. In an example, an audio alert may be sent to the receiver of the hearing instrument 100. The audio alert could send specific voice commands to the user to make quick action in preventing degraded performance due to poor quality links. The alert may be vibration, sound or display on the screen of the personal electronic device. The displayed alert may include alert pop-up windows, banners that temporarily appear, badges, or a listing in a notification center of the device. The application 104 operating on the personal electronic device 103 may record the location where the degradation occurred, and may record the presence of Wi-Fi and the RSSI of cellular signals.

Quality may be monitored while the application 104 is running on the mobile device 103. In some embodiments, the application 104 uses geotagging to provide location information and time stamp information associated with the detection of a degraded link quality. The geotagging and time stamping can later be used by the end user to troubleshoot problems with link quality. The application 104 operating on the personal electronic device 103 may use this information to provide diagnostic feedback to the user on possible solutions to improve the link quality. Based upon the geotag, the degraded link quality may be associated with different information, such as Wi-Fi interference, cellular interference, etc. In some embodiments, the environmental status, which may be detected by the personal electronic device 103, may be used in conjunction with various statistics such as number of nearby access points, PER, etc., to determine the most likely causes of the degraded wireless link. Thus, the application 104 running on the personal electronic device 103 may present feedback to the end user for improving the wireless link quality. The personal electronic device 103 may identify the most likely corrective actions and include those corrective actions in the alert to the end user or otherwise provide those suggestions for correction to the end user. The link quality diagnostic tool implemented within the application 104 may be used to teach the end user the causes of the degraded link quality, allowing the user to learn what the variables that favor a higher quality link and the variables that create degraded link quality.

By way of example, degradations to the wireless link may be expected when the RSSI drops to the range of receiver sensitivity such as, by way of example, −90 dBm or other defined sensitivity level. For example, the degradations to link quality may be caused by a user may have their hand over the phone or may be caused by the orientation of the phone (e.g. the display facing out). The link quality diagnostic application may suggest to move the phone orientation in the pocket or make sure the phone is not obstructed by their hand or other objects. The specific suggestion may be based on the RSSI measurement and/or other monitored conditions. For example, the low RSSI might also be associated with a non-multipath environment. If the RSSI is low and the person's location is outside, the application would again suggest to move the phone to a different pocket location/orientation. Various embodiments of the link quality diagnostic application may ask the user if they are outside. Various embodiments may determine if the user is outside based on GPS location services of the phone and/or by monitoring cellular signal strength. For example, if the cellular signal strength suddenly increases, then it may be an indication that the user has moved from an indoor, multipath environment to an outdoor, non-multipath environment.

Various embodiments of the link quality diagnostic application may present questions to the user. The questions may form a decision tree. For example, the questions may ask if the user is indoors or outdoors, or otherwise in a place with walls or other surfaces on which signals may bounce. The questions may ask if the user is near Wi-Fi networks, routers or other sources of interference. Some embodiments of the application are configured to work with the personal electronic device to query the RSSI of the Wi-Fi and obtain information from the phone itself such as the number of Wi-Fi Access points. In another example, if RSSI is high enough that the link quality should be good but PER is too high for the listed RSSI, then the PER may be degraded because of Wi-Fi interference If an LTE signal is present, RSSI should indicate a strong link that should not be degraded. However, in the presence of the LTE interferers, the Echo test may identify a degradation in throughput or the number of retransmissions may be higher than expected. In such situations, it may be concluded that external interference is likely the cause of the degraded link performance.

Figure 2:
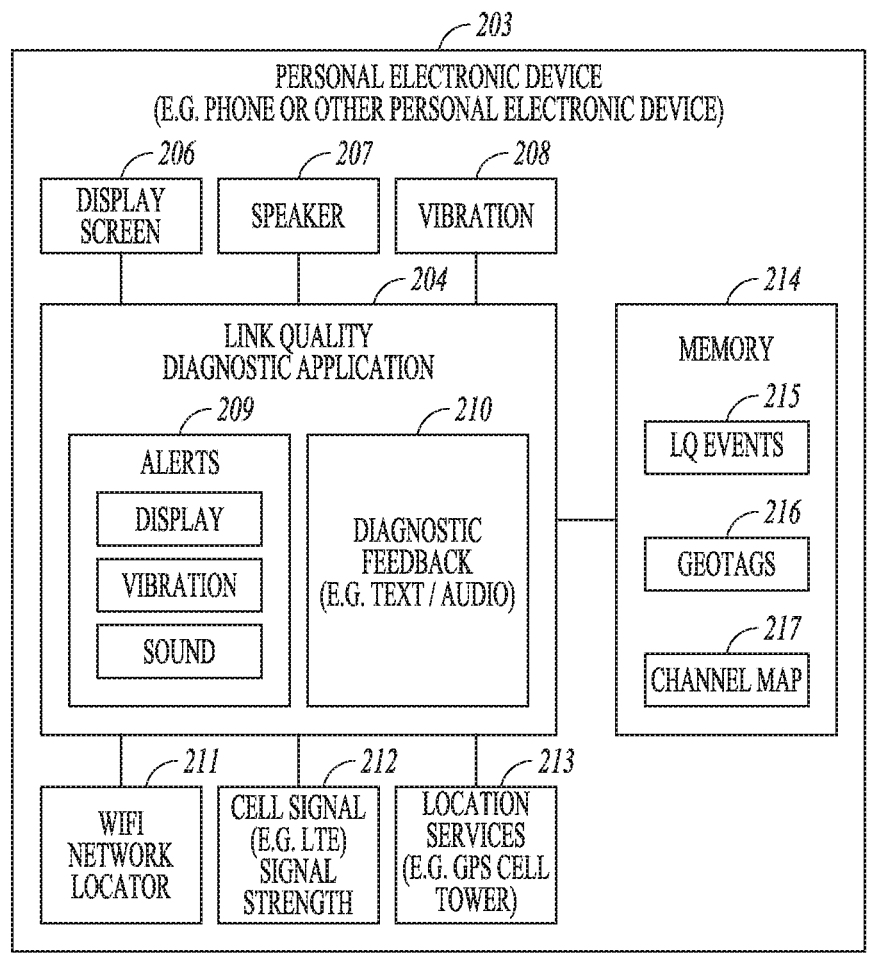
FIG. 2 illustrates an example of a personal electronic device, such as may be implemented in the systems illustrated in FIGS. 1A-1G.

FIG. 2 illustrates an example of a personal electronic device, such as may be implemented in the systems illustrated in FIGS. 1A-1G. The illustrated personal electronic device 203 may be a smart phone or tablet. The personal electronic device may contain a link quality diagnostic application 204 similar to the application 104 illustrated in FIGS. 1A-1G.

The personal electronic device 203 may include a display screen 206, a speaker 207, and a vibration transducer 208. These may be used by the application 204 to provide alerts 209 such as an alert provided in the display and/or provided by vibration and/or sound) and diagnostic feedback 210. The personal electronic device 203 may include a Wi-Fi network locator 211 such as may indicate available networks in the vicinity of the device. The personal electronic device 203 may include a cell signal strength indicator 212, and the personal electronic device 203 may include location services 213 such as a GPS, Wi-Fi or cell tower information. These may be used by the application to identify potential sources of interference and/or location useful in providing diagnostic information to the end user. The personal electronic device 203 further may include memory 214 to store link quality events 215 which may be limited to link quality events where there is a degradation in link quality, and to store geotags 216 to provide location and time stamps associated with the link quality events. Some embodiments may store a channel map 217 in the memory 214, and use a change or lack of change in the channel map to identify potential sources of link quality degradation.

One challenge with RF communication is multipath propagation of signals in which radio signals reach the receiving antenna by two or more paths. The overall signal at the radio receiver is the sum of the signals being received. As multipath signals have different path lengths, the signals will add and subtract from the total dependent upon their relative phases. The effects of multipath include constructive and destructive interference and phase shifting of the signal, which may be perceived as multipath fading of RF signals. A mobile wireless device, particularly within a building, may encounter a dynamically-changing environment of multipath propagation as the device changes locations and orientations, and as objects and people also move within this environment.

Figure 3:
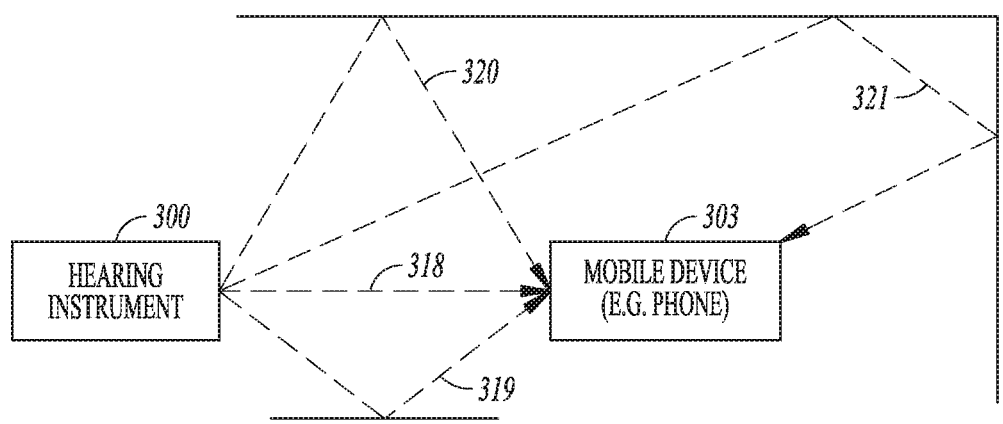
FIG. 3 is a simple illustration of multi-path propagation that may exist during wireless communication between a hearing instrument 300 and a personal electronic device 303.

FIG. 3 is a simple illustration of multi-path propagation that may exist during wireless communication between a hearing instrument 300 and a personal electronic device 303. Multi-path propagation indicates that radio signals are reaching the receiving antenna by two or more paths. The RF signals may be directly communicated between devices, but also may reflect off of surfaces such as walls, ceilings, floors, furniture, etc. For example, the simple illustration of FIG. 3 only shows four wireless communication paths. A first path 318 may be a direct, straight-line path between the devices, a second path 319 may be reflected off of a floor, a third path 320 may be reflected off of a ceiling, and a fourth path 321 may be reflected off of a ceiling and a wall.

FIG. 4 is a simple illustration, provided by way of example and not limitation, of the multipath waveforms in the time domain that may be received at a wireless receiver. The overall signal at the radio receiver is the sum of the signals being received. As multipath signals have different path lengths, the signals will add and subtract from the total dependent upon their relative phases. In FIG. 4, four signals are received. These signals may have traveled the paths illustrated in FIG. 3. Although the signals have the same frequency, they have different phases introduced by the different lengths of the different paths, causing the signals to be received at different times. Further, the strength of the signals (e.g. amplitude) from each of these paths may also be different. Frequency is inversely related to wavelength. Thus, a change in frequency (e.g. channel change) changes the wavelength. The different wavelengths will change how the phases of the multipath signals align at the receiver.

The effects of multipath include constructive and destructive interference and phase shifting of the signal, which may be perceived as multi-path fading of RF signals. FIGS. 5A and 5B illustrate constructive wave interference and destructive wave interference for two waves. When two waves constructively interfere as illustrated in FIG. 5A, they arrive generally in phase with each other so that sum of the amplitudes of each signal is greater than the amplitude of one of the signals. When two waves destructively interfere as illustrated in FIG. 5B, they arrive generally out of phase with each other so that the amplitudes of the signals at least partially cancel each other. These figures are simple illustrations indicating a phase difference of about 0 degrees in FIG. 5A and a phase difference of about 180 degrees in FIG. 5B. Multi-path propagation is more complex. However, in comparison to signal strength in the straight-line path, the multipath signals sum together in a manner that still may generally enhance the strength of the received signal or may generally reduce the strength of the received signal. Mobile wireless devices, particularly within a building, may encounter a dynamically-changing environment of multipath propagation as it changes locations and orientations, and as objects and people also move within this environment. For example, an RF communication device typically worn by a human experiences dynamic multipath fading that is dynamic relative to the movements of a human being.

Communication channels correspond to specific communication frequencies, each of these communication frequencies have a characteristic wavelength. Thus, given a certain set of communication paths in a multi-path environment, some channels will reduce the signal strength more than other channels. Further, some channels may enhance the strength of the received signal, whereas other channels will reduce the strength of the received signal.

Therefore, in a multi-path environment (e.g. indoors) where signals are reflecting off of surfaces, there may be a better link quality for certain channels than would be experienced in a non-multi-path environment (e.g. outdoors). If the link quality is suddenly degraded because the personal electronic device has moved outdoors, then the application may suggest that the end user move the personal electronic device to provide a more direct path to the hearing instrument(s) to improve the link quality of the wireless communication with the hearing instrument(s).

A channel map used in an adaptive frequency hopping scheme may be used to identify a combination of channels exhibiting good multi-path characteristics and low interference and noise. Bluetooth low energy (BLE) is a distinguishing feature of Bluetooth version 4.0 wireless communication technology that provides low-power devices with short-range low-power wireless connectivity. BLE-based hearing instruments and Bluetooth headsets also have the ability to get the Adaptive Frequency Hopping (AFH) channel map via the Host Controller Interface MCI) that has been set for the wireless link. If degraded performance is determined by the hearing instruments or personal electronic device and the AFH channel map is reduced, it can be concluded that in-band interference might be causing the degraded performance to the wireless link. In this case the link quality diagnostic application may indicate to move away from Wi-Fi access points or other sources of interference.

Figure 6:
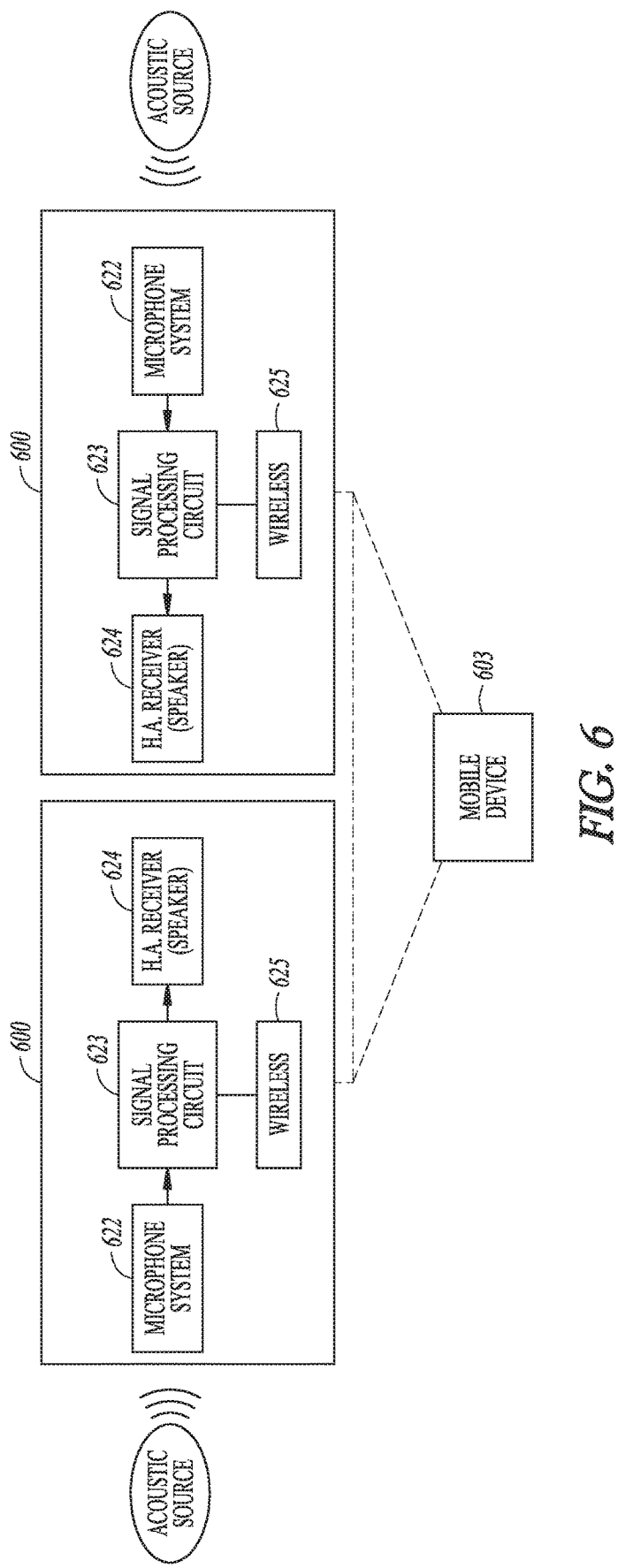
FIG. 6 illustrates, by way of example and not limitation, a wireless hearing instrument system.

FIG. 6 illustrates, by way of example and not limitation, a wireless hearing instrument system. The illustrated hearing instrument system may include one or more hearing instruments 600 and a mobile device 603 such as a phone or tablet. The illustrated system in FIG. 6 includes two hearing instruments, but the system is not limited to two. The microphone system 622 transforms the acoustic energy of sound from an acoustic source into a signal representative of the sound. The signal processing circuit 623 receives the signal from the microphone system 622, and is designed (e.g. programmed) to appropriately adjust the signal for the wearer of the hearing instrument. In some embodiments, the hearing instrument(s) include hearing aid(s), which may include a signal processing circuit configured to compensate for the hearing impairment of the wearer of the hearing instrument. The signal processing circuit 623 outputs a processed signal to the hearing instrument receiver 624, which converts the processed electrical signal into a sound perceived by the wearer. The illustrated hearing instrument embodiment also includes a wireless communication circuit 625 adapted to transmit and/or receive wireless signals. The wireless communication circuit 625 may include a receiver, a transmitter, or a transceiver. The signal processing circuit 623 (or controller) controls the wireless communication circuit 625 to control the wireless communication with other devices.

As illustrated by the dotted lines, the personal electronic device may be adapted to wireless communicate with both hearing instruments, the first hearing instrument is adapted to wirelessly communicate with the second hearing instrument and the device, and the second hearing instrument may be adapted to wirelessly communicate with the first hearing instrument and the device. The communication signals may include data and/or audio. Examples of data include programming instructions, device diagnostics, and link quality information. Examples of audio include digital audio or compressed digital audio. By way of example and not limitation, the hearing instruments may be configured to operate using NFMI, 900 MHz, 2.4 GHz or other wireless technology. The devices may be designed to operate in another frequency band(s) of interest.

FIGS. 7A-7D illustrate, by way of example and not limitation, some process embodiments that may be performed using a system. One or more LQMs may be measured such as discussed above. As identified in the examples above, additional diagnostic value may be provided using more than one LQM (e.g. RSSI, PER, Echo throughput, etc.). These may be compared individually, or a function may be applied to LQM inputs to provide an LQM output.

Figure 7A:
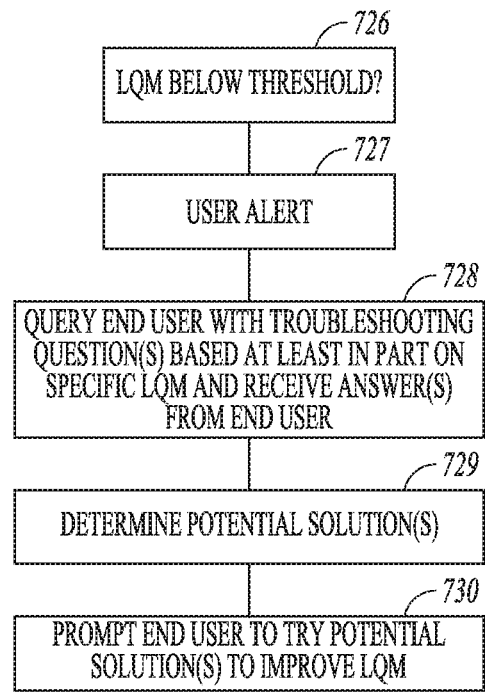
FIGS. 7A-7D illustrate, by way of example and not limitation, some process embodiments that may be performed using a system.

With reference to FIG. 7A, a determination is made whether the LQM(s) indicate that the link quality is degraded (e.g. the LQM(s) or LQM output of a function is below a threshold 726). Upon determining that the LQM is below the threshold, then the application on the personal electronic device may initiate an alert to the end user 727, and then query the end user with troubleshooting question(s) 728. The troubleshooting questions may be presented on the display of the personal electronic device and/or audibly such as may be provided using a speaker of the mobile or a wearable device. For example, the audible queries may be presented to the end user through the receiver of the hearing instrument(s).

If more than one acquired LQM is used, the system may be designed with logic to provide the threshold determination. For example, the logic may send the alert if any one LQM is below a threshold for indicating a quality link, or may send the alert only if both LQMs are below the threshold for indicating a quality link. More complex logic or functions may be applied as well. For example, the signal strength or error rate may be considered in presenting the troubleshooting queries even if the strength or error rate, in and of themselves, do not fall below the threshold. The troubleshooting queries are based at least in part on the specific LQM(s) individually or in combination that have acquired. The application on the personal electronic device receives answers from the end user (e.g. via touch screen display and/or voice).

At 729, the application on the personal electronic device determines a potential solution or potential solutions to the degraded link quality, and then prompts the end user to try potential solution(s) to the degradation to improve link quality (i.e. improve the LQM(s)) 730. The determination of the potential solutions may be completely provided by the application running on the personal electronic device. In some embodiments, the personal electronic device may communicate to a cloud server to automatically determine the queries, receive answers from the end user, and/or determine the potential solution. Such cloud servers may leverage successful solutions for other end users to provide the potential solution(s) to an individual end user. The prompts may be delivered as part of the alert on the personal electronic device, may be otherwise provided by or delivered to the personal electronic device (text message or email) or may be voice prompts such as may be delivered through the speaker of the personal electronic device, the receiver of the hearing instrument, or the speaker of another wearable device.

Figure 7B:
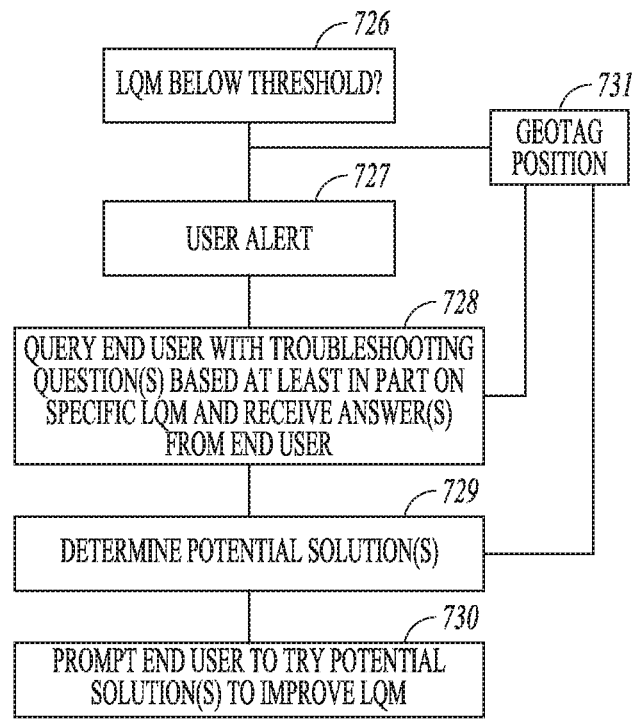

FIG. 7B is similar to FIG. 7A, but adds geotagging 731, in which a time stamp and a location where the degraded quality link was experienced may be associated with the LQM(s) of a degraded link quality event, and these may be stored in a memory of the device, and used to determine the troubleshooting questions to be presented to the end user 728 and/or used to determine the potential solution(s) 729. The location information may be sensed by the device (e.g. GPS, cell signals, Wi-Fi networks) or may be provided to the device by the end user. For example, the process may query the end user at 728 before proceeding to tag the LQM event with a location and time stamp. A geotag coordinate may be compared with the known location for interference sources such as cell phone towers. Some embodiments may collect the data (e.g. LQM(s) and geotag(s)) from a plurality of users and store the data, such as in a cloud storage environment. All of the users' issues may be collectively logged and leveraged to accommodate the environments of the users.

Figure 7C:
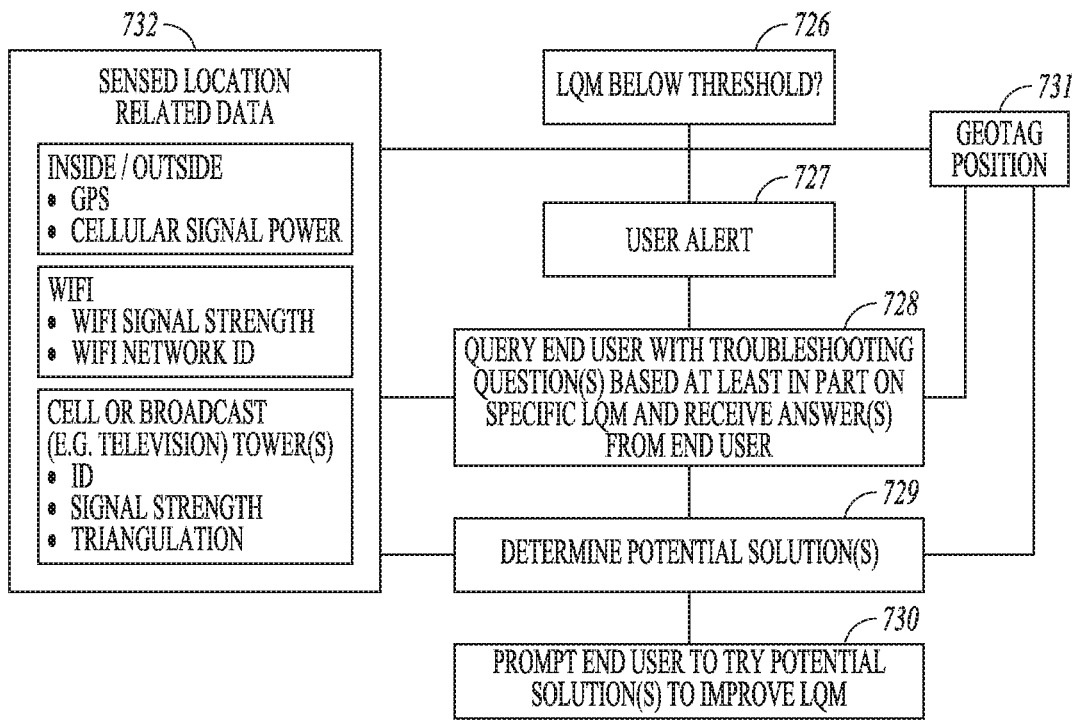

FIG. 7C is similar to FIG. 7B, but adds some specific mechanisms for the personal electronic device to sense location-related data 732 which may be used to geotag the position 731. The sensed location-related data 732 may be useful to determine the troubleshooting questions to be presented to the end user 728 and/or used to determine the potential solution(s) 729. By way of example, whether the end user is inside (e.g. multi-path environment) or outside (e.g. non-multi-path environment) may sensed using GPS signals or received cellular signal power. The GPS signal may be used to know when personal electronic device is in a stationary building. A reduced cellular signal power may also indicate that the personal electronic device is in a building which is reducing the strength of the cellular signal. For example, a slight change of position determined by GPS or other mechanism in conjunction with a sudden increase in cell signal strength may indicate that the end user has exited a building and is in a non-multi-path environment. Furthermore, the Wi-Fi networks may be detected by the personal electronic device, and this information may be used to determine location based on the existence of a network. Additional information may be provided by the identity of a network, and/or the strength of the Wi-Fi signal. Cellular or broadcast signals may also be used to determine location based on the identity of the signal, the signal strength, and triangulation methods.

Figure 7D:
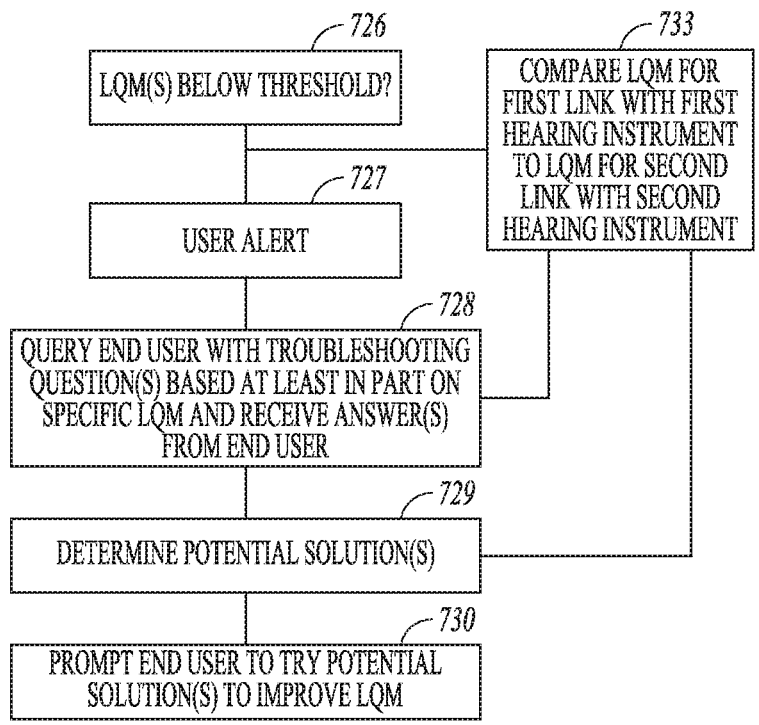

FIG. 7D is similar to FIG. 7A, but illustrates a method that may be implemented in a system where there are multiple communication links. For example, the system may include a first hearing instrument that is configured to communicate over a first wireless link to a personal electronic device and a second hearing instrument that is configured to communicate over a second wireless link to the personal electronic device. LQM(s) may be determined for each link. Additional information may be gleaned by comparing the LQM(s) for the first link to the LQM(s) for the second link. In an example such as may be implemented using systems illustrated in FIGS. 1B-1F, if the phone is in the left pants pocket, a hearing instrument for the left ear may have a good link but a hearing instrument for the right ear may not have a good link. For example, significantly different LQM(s) for the different links may indicate that the personal electronic device should be repositioned or reoriented in a particular direction (e.g. toward the right ear) to improve the link quality of the wireless link that has the worst LQM(s). In an example such as may be implemented using a system illustrated in FIG. 1G, both channels are sent to one device. For example, the hearing instrument illustrated lower in figure may be receiving from the personal electronic device 103 a channel for itself and a channel for the other hearing instrument. A determination of which hearing instrument 100 has the stronger signal with the personal electronic device 103. If the other hearing instrument has the stronger signal, then the system may handoff the communication such that the hearing instrument illustrated higher in the figure receives from the personal electronic device both channels (the channel for itself and the channel for the other hearing instrument).

Figure 8:
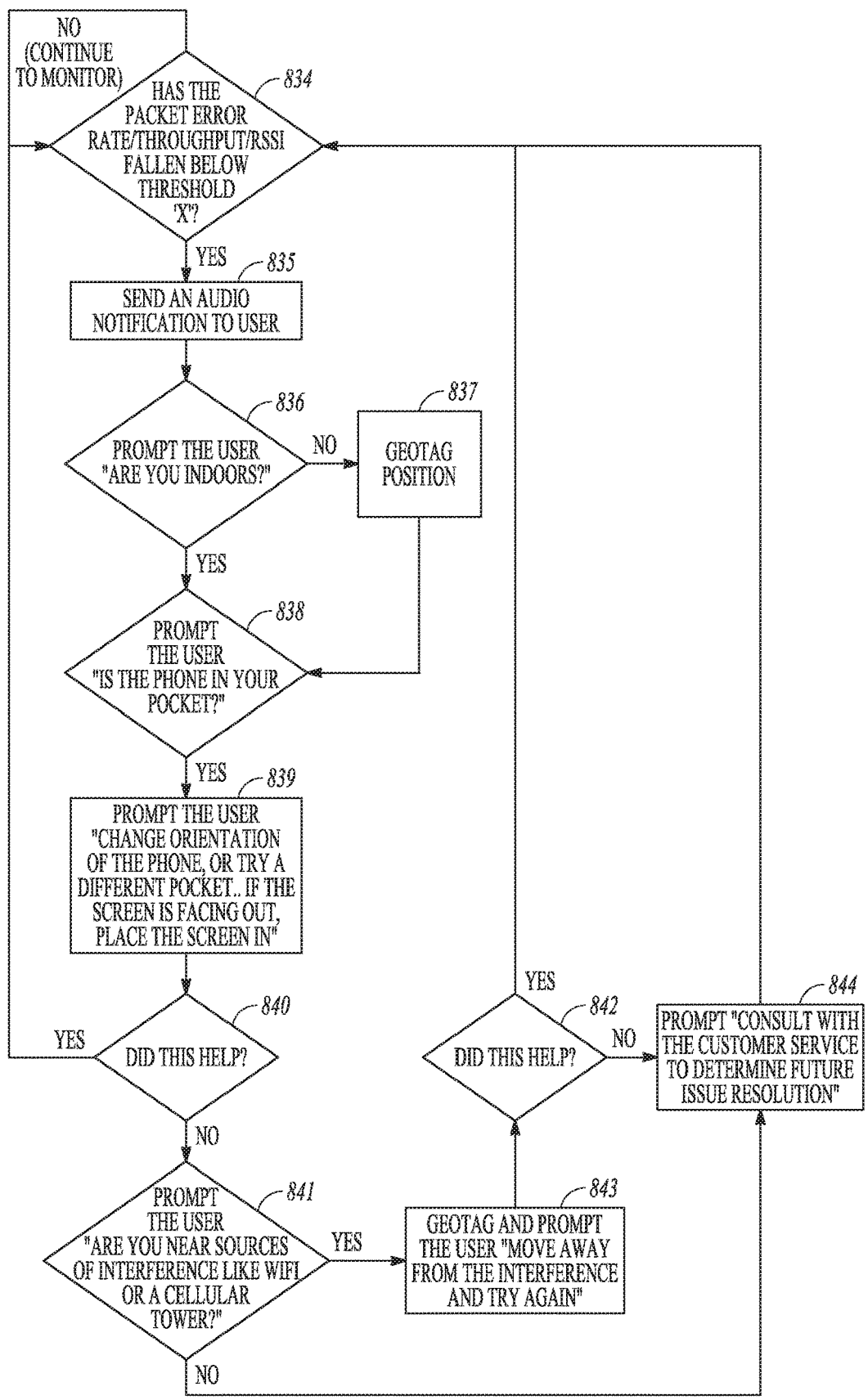
FIG. 8 is a flow diagram, by way of example and not limitation, of a process that may be implemented by a personal electronic device that is operating on a link quality diagnostic application.

FIG. 8 is a flow diagram, by way of example and not limitation, of a process that may be implemented by a personal electronic device that is operating on a link quality diagnostic application. At 834, the personal electronic device may be determining whether the LQM(s) indicate that the link quality has been degraded. For example, PER, throughput, RSSI may be monitored to determine if any have fallen below a threshold. At 835, a notification (e.g. audio) maybe sent. As identified previously, there are a number of option for sending a notification. For example, the phone may vibrate, may provide a status notification in the form of an icon, and/or may provide an audible notice. The method may proceed to 836 to query the end user "Are you indoors?" If the received answer is that the user is outdoors, then the position of the personal electronic device may be geotagged 837. For example, if the end user is outdoors, the geotag coordinate may be compared with the known location for interference sources such as cell phone towers. Some embodiments may also perform geotagging when the end user is indoors and near interfering sources such as Wi-Fi. In the illustrated example, if the end user indicates that the mobile phone is indoors, then the personal electronic device may query the end user "Is the phone (or other personal electronic device) in your pocket?" 838. If the phone is in the pocket, then the end user maybe prompted to change the orientation of the phone (e.g. if screen is facing out, try facing it in) by a different pocket 839. The personal electronic device may check if the movement helped 840, which maybe by re-measuring LQM(s) or by querying the end user. If the suggestion helped to improve the link quality, then the process may return to 834 to continue to monitor LQM(s). If the suggested help did not improve link quality, then the user may be queried "Are you near sources of interference link Wi-Fi or a cellular tower?" 841. If the answer is yes, then the location may be geotagged and the end user may be prompted with a potential solution to move away from the interference and try again 843. The personal electronic device may check if the movement helped 842, which maybe by re-measuring LQM(s) or by querying the end user. If the suggestion helped to improve the link quality, then the process may return to 834 to continue to monitor LQM(s). After likely solution(s) have been exhausted, the process may prompt the end user to consult with customer service 844. In the illustrated example, the end user is prompted to consult with the customer service if the user is not near sources of interference at 841, or if moving away from a source of interference does not help 842. It is again noted that FIG. 8 is an example. Different LQM(s), different prompts, and different queries may be used. Furthermore, the order or logic of the decision tree may be modified.

The present subject matter may be employed in hearing assistance devices, such as hearing aids, headsets, headphones, and similar hearing devices. Hearing assistance devices typically include at least one enclosure or housing, a microphone, hearing assistance device electronics including processing electronics, and a speaker or "receiver." Hearing assistance devices may include a power source, such as a battery. In various embodiments, the battery may be rechargeable. In various embodiments multiple energy sources may be employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing instruments include a processor. In digital hearing instruments with a processor, programmable gains may be employed to adjust the hearing instrument output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application can be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments, different realizations of the block diagrams, circuits, and processes set forth herein can be created by one of skill in the art without departing from the scope of the present subject matter.

Various embodiments of the present subject matter support wireless communications with a hearing assistance device. In various embodiments the wireless communications can include standard or nonstandard communications. Some examples of standard wireless communications include, but not limited to, Bluetooth™, low energy Bluetooth, IEEE 802.11(wireless LANs), 802.15 (WPANs), and 802.16 (WiMAX). Cellular communications may include, but not limited to, CDMA, GSM, LTE, ZigBee, and ultra-wideband (UWB) technologies. In various embodiments, the communications are radio frequency communications. In various embodiments the communications are optical communications, such as infrared communications. In various embodiments, the communications are inductive communications. In various embodiments, the communications are ultrasound communications. Although embodiments of the present system may be demonstrated as radio communication systems, it is possible that other forms of wireless communications can be used. It is understood that past and present standards can be used. It is also contemplated that future versions of these standards and new fixture standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new protocols may be employed without departing from the scope of the present subject matter.

In various embodiments, the present subject matter is used in hearing assistance devices that are configured to communicate with mobile phones. In such embodiments, the hearing assistance device may be operable to perform one or more of the following: answer incoming calls, hang up on calls, and/or provide two way telephone communications. In various embodiments, the present subject matter is used in hearing assistance devices configured to communicate with packet-based devices. In various embodiments, the present subject matter includes hearing assistance devices configured to communicate with streaming audio devices. In various embodiments, the present subject matter includes hearing assistance devices configured to communicate with Wi-Fi devices. In various embodiments, the present subject matter includes hearing assistance devices capable of being controlled by remote control devices.

It is further understood that different hearing assistance devices may embody the present subject matter without departing from the scope of the present disclosure. The devices depicted in the figures are intended to demonstrate the subject matter, but not necessarily in a limited, exhaustive, or exclusive sense. It is also understood that the present subject matter can be used with a device designed for use in the right ear or the left ear or both ears of the wearer.

The present subject matter is demonstrated for hearing instruments including hearing assistance devices. Hearing instruments may include, but are not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices. The present subject matter can also be used in deep insertion devices having a transducer, such as a receiver or microphone. The present subject matter can be used in devices whether such devices are standard or custom fit and whether they provide an open or an occlusive design. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A system for use with a wearable device and by an end user of the wearable device to improve wireless communication link quality, comprising:
   a personal electronic device configured to communicate over a wireless communication link to the wearable device, the personal electronic device including memory, at least one hardware processor, and a user interface configured for use to present one or more troubleshooting questions to the end user and receive one or more answers from the end user;
   the personal electronic device further including a link quality diagnostic application in the memory, wherein the at least one hardware processor of the personal electronic device is configured to operate on the link quality diagnostic application to use the user interface to:
   acquire at least one link quality metric (LQM) for the wireless link measured using the personal electronic device, the wearable device, or both the personal electronic device and the wearable device;
   detect a link quality degradation using the at least one LQM;

present the end user of the wearable device with the one or more troubleshooting questions based on the link quality degradation, and process one or more answers to the one or more troubleshooting questions, wherein the one or more answers are from the end user; and provide diagnostic feedback to the end user, based on the processed one or more answers, to suggest corrective action to improve the link quality of the wireless communication link.

2. The system of claim 1, wherein the personal electronic device is configured to operate on the link quality diagnostic application to use the at least one LQM to select the at least one troubleshooting question and provide the diagnostic feedback.

3. The system of claim 1, wherein the at least one LQM includes at least one LQM selected from the group of LQMs consisting of:
received signal strength indicator (RSSI);
bit error rate (BER),
packet error rate (PER),
cyclic redundancy check (CRC) errors,
forward error correction (FEC) errors,
signal-to-noise ratio (SNR), and
retransmissions; and
throughput for an Echo test.

4. The system of claim 1, wherein the at least one LQM includes at least two LQMs selected from the group of LQMs, and the personal electronic device is configured to operate on the link quality diagnostic application to:
acquire the at least two LQMs for the wireless link using the personal electronic device, the wearable device, or both the personal electronic device and the wearable device; and
using the at least two LQMs to select at least one troubleshooting question and determine the at least one potential solution.

5. The system of claim 1, wherein the personal electronic device is configured to operate on the link quality diagnostic application to geotag a location and time stamp for a link quality event, the link quality event being an instance of the link quality degradation.

6. The system of claim 1, wherein the personal electronic device is configured to operate on the link quality diagnostic application to sense if the personal electronic device is inside in a multi-path environment or outside.

7. The system of claim 1, wherein the personal electronic device is configured to operate on the link quality diagnostic application to sense location-related data using Wi-Fi signals.

8. The system of claim 1, wherein the personal electronic device is configured to operate on the link quality diagnostic application to sense location-related data using GPS.

9. The system of claim 1, wherein the personal electronic device is configured to operate on the link quality diagnostic application to sense location-related data using cellular signals.

10. The system of claim 1, wherein the personal electronic device is configured to operate on the link quality diagnostic application to sense location-related data using broadcast station signals.

11. The system of claim 1, wherein the personal electronic device is configured to operate on the link quality device to alert the end user of the link quality degradation using the personal electronic device to produce vibrations or sound.

12. The system of claim 1, wherein the personal electronic device is configured to operate on the link quality device to alert the end user of the link quality degradation using a pop-up window, a banner, a badge, or a listing in a notification center of the personal electronic device.

13. The system of claim 1, wherein the personal electronic device is a smart phone.

14. The system of claim 1, wherein the wearable device is a hearing instrument configured to communicate with the personal electronic device over the wireless link.

15. The system of claim 14, wherein the personal electronic device is configured to operate on the link quality diagnostic application to:
alert the end user of the degraded link quality using the hearing instrument to present sound to the end user; or
alert the end user of an improved link quality using the hearing instrument to present sound to the end user; or
alter the end user of both the degraded link quality and the improved link quality using the hearing instrument to present sound to the end user.

16. The system of claim 14, further comprising another hearing instrument configured to communication with the personal electronic device over another wireless link, wherein the personal electronic device is configured to operate on the link quality diagnostic program to:
acquire at least one LQM for each of the two wireless links;
compare the at least one LQM for the two wireless links to provide a comparison; and
determine potential solutions for the link quality degradation using the comparison.

17. A method performed to improve wireless communication link quality using a link quality diagnostic application operated on by a personal electronic device that has at least one hardware processor and a user interface configured for use to present one or more troubleshooting questions to the end user and receive one or more answers from the end user, the method including using the personal electronic device and the link quality diagnostic application to:
acquire at least one link quality metric (LQM) for a wireless communication link measured using the personal electronic device, a wearable device, or both the personal electronic device and the wearable device, the wireless communication link being between the wearable device and the personal electronic device or between the wearable device and another external device;
detect a link quality degradation for the wireless communication link using the at least one LQM;
present an end user of the wearable device with the one or more troubleshooting questions based on the link quality degradation;
process one or more answers to the one or more troubleshooting questions, wherein the one or more answers are from the end user; and
provide diagnostic feedback to the end user, based on the processed one or more answers, to suggest corrective action to improve the link quality.

18. The method of claim 17,
wherein the at least one LQM includes at least two LQMs selected from the group of LQMs consisting of:
received signal strength indicator (RSSI);
bit error rate (BER),
packet error rate (PER),
cyclic redundancy check (CRC) errors,
forward error correction (FEC) errors,
signal-to-noise ratio (SNR), and
retransmissions;
throughput for an Echo test; and
a channel map change.

19. The method of claim 17, wherein the wearable device is a hearing instrument, and the wireless communication link is between the personal electronic device and the hearing instrument.

20. A system for use with a wearable device and by an end user of the wearable device to improve wireless communication link quality, comprising:

a personal electronic device configured to communicate over a wireless communication link to the wearable device, the personal electronic device including at least one hardware processor and a user interface configured for use to present one or more troubleshooting questions to the end user and receive one or more answers from the end user;

the at least one hardware processor of the personal electronic device configured to interact with a cloud-based link quality diagnostic application, wherein the personal electronic device and the cloud-based link quality diagnostic application are configured to cooperate to use the user interface to:

acquire at least one link quality metric (LQM) for the wireless link measured using the personal electronic device, the wearable device, or both the personal electronic device and the wearable device;

detect a link quality degradation using the at least one LQM;

present the end user of the wearable device with the one or more troubleshooting questions based on the link quality degradation, and process one or more answers to the one or more troubleshooting questions, wherein the one or more answers are from the end user; and provide diagnostic feedback to the end user, based on the processed one or more answers, to suggest corrective action to improve the link quality of the wireless communication link.

\* \* \* \* \*